Patented May 19, 1936

2,040,926

UNITED STATES PATENT OFFICE 2,040,926

CONCENTRATION OF ALIPHATIC ACIDS

Henry Dreyfus, London, England

No Drawing. Application August 30, 1932, Serial No. 631,101. In Great Britain October 10, 1931

8 Claims. (Cl. 260—122)

This invention relates to the concentration of dilute aliphatic acids, and especially to the concentration of dilute acetic acid such as results from industrial acetylation processes, for instance from the acetylation of cellulose.

According to the invention I have found that dilute aqueous solutions of aliphatic acids, and particularly dilute acetic acid resulting from the acetylation of cellulose, may be concentrated in a very satisfactory way by treating them with heavy metals, or compounds thereof, from whose acetates the acid may be recovered by thermal decomposition. Examples of such metals are copper, aluminium, chromium, iron, cobalt, nickel. The acetates or other salts formed are separated from the aqueous mother liquors and, if a very concentrated acid or a mixture of acid and anhydride is required, they are heated or otherwise treated so as to remove more or less completely their water content. The salts are then subjected to thermal decomposition either alone or, especially if anhydride formation is desired, in admixture with salts of stronger acids, such as sulphates, chlorides, or the like.

The formation of the heavy metal acetates from the dilute acid may be effected in any convenient way. For example, the acid may be treated, preferably at elevated temperatures, with an oxide, hydroxide or carbonate of the heavy metal, the liquor being preferably stirred or otherwise agitated during the reaction. Thus the acid may be treated with, for example, aluminium hydroxide, copper oxide, chromium hydroxide, cobalt carbonate or nickel hydroxide, but any other compounds capable of yielding acetates with dilute acetic acid may be used. Advantageously the heavy metal compound is added to the acid liquor in stages. Moreover, the heavy metal may be employed in the free state, under conditions such that it is capable of being dissolved by the acid. Thus copper powder may be employed in the presence of oxygen or air. Preferably, however, the metals are employed in the form of compounds.

The heavy metals may be employed in any convenient quantities, but when copper is the heavy metal employed, it is advisable to use such quantities that the solution remains distinctly acid, in order to avoid the formation of basic acetates of this metal, the presence of which might exercise an unfavourable effect on the subsequent decomposition of the acetate and recovery of acetic acid.

The separation of the acetate from the aqueous mother liquor may be effected in any convenient way. Thus the solution may be evaporated to dryness, under normal or reduced pressure. It is preferable, however, especially when copper acetate is present, to separate the acetates as, for instance, by crystallization or salting out, if necessary after a partial evaporation; in this way the risk of basic salt formation is further reduced. For example, a copper acetate solution formed in accordance with the invention may be cooled, and an alkali or other very soluble acetate added to promote the separation of the cupric acetate. The advisability of making such an addition of a more soluble acetate, and the quantity required will depend, of course, on the initial concentration of the acid liquor. When a moderately concentrated acid is to be further concentrated, and the salt formation is effected at a fairly high temperature, for instance from 70°–90° C. a large proportion of the cupric or other acetate will separate out merely on cooling. When however a comparatively dilute acid is to be concentrated it will usually be found desirable to employ both cooling and salting out in order to get a satisfactory separation of the cupric or other acetate.

Another method of separation that may be employed is the precipitation of the salt from the solution by means of a water-miscible organic liquid, in which the salt is insoluble or very much less soluble than it is in water. Such organic liquid is preferably added to the cooled liquor, which may already have been concentrated to some extent, for instance by evaporation. The salt thus obtained, or obtained in any other way, may if desired be washed with such organic liquid to remove extraneous water from the salt. However the extraneous water or aqueous mother liquor may be removed from the salt in any other convenient way, for example by centrifuging, filtration or the like.

Usually the salts will contain water of crystallization. Thus an aqueous solution of cupric acetate and free acetic acid of specific gravity less than about 1.10 will yield cupric acetate substantially in the form of the monohydrate. When solutions of higher specific gravity, and especially of specific gravity higher than 1.15 are employed, cupric acetate pentahydrate is largely obtained. Similarly cobaltous acetate will usually be obtained in the form of the tetrahydrate, but aluminium acetate separates without water of crystallization.

If desired, any water of crystallization contained in the salt may be removed before subjecting the salt to thermal decomposition. Thus the salt may be heated in a current of air to a temperature, for example, of 50°–125° C. or under reduced pressure to a lower temperature. The most favourable temperature for this purpose will, of course, depend on the particular salt that is to be dehydrated, and the degree to which this dehydration is to be carried out. Thus, for example, when it is desired to convert cupric acetate pentahydrate into the monohydrate it is sufficient to heat the salt to a temperature of 50° C. although temperatures up to 100°–110° C. may be employed if desired. Frequently, however, it will not be necessary to expel water of crystallization, unless formation of anhydride is desired.

The aqueous mother liquor from which the salt has been separated may be treated in any convenient way. Thus for example it may, especially when copper is employed as the heavy metal, be employed as a starting material for the production of basic acetates useful in the colour and like industries; or it may, if necessary after complete neutralization, be evaporated and the residue distilled with sulphuric acid to give concentrated aliphatic acid.

The salts may be subjected to decomposition and the aliphatic acid recovered in any convenient way. Preferably, however, the salts are subjected to thermal decomposition, either alone or in the presence of a salt of a stronger acid such as a sulphate or chloride of the metal present in the aliphatic acid salt. The use of such salts of stronger acids is particularly advantageous when a product containing anhydride is desired.

The decomposition may be effected at any suitable temperature, and temperatures between 200° and 450° C. are especially useful. Excessive heating, which is liable to cause destruction of the aliphatic acid or anhydride (if such is present) should of course be avoided. Any tendency to such decomposition may be very much lessened if the decomposition is carried out in a stream of air, carbon dioxide, or other indifferent gas, or an inert vapour such as benzene or petroleum ether, or the vapour of the aliphatic acid being formed. The decomposition may advantageously be effected under pressures less than atmospheric, for example pressures between 100 and 700 mm. of mercury, although pressures lower or higher than this, or even pressures above atmospheric may be employed.

The product obtained depends largely on the amount of water present as water of crystallization or otherwise in the salt to be decomposed. Thus for instance cupric acetate monohydrate will yield a very concentrated acetic acid, while if the anhydrous form of this salt is employed, acetic anhydride will be formed. On the other hand cupric acetate pentahydrate will, unless the water is separated from the acetic acid, give rise to a more dilute acid. Similarly, when aluminium acetate, which crystallizes in the anhydrous form, is required to give glacial acetic acid, it is advisable not to employ the salt in an absolutely dry state, but to effect the decomposition in the presence of water in amount up to about three molecular parts of water to two of the anhydrous aluminium acetate.

When a salt is employed containing more water than is required in the final product (including combined water) the aliphatic acid may conveniently be separated from the excess water while still in the vapour phase. Such a separation is particularly valuable when salts are used which contain more water of crystallization than is required in the final product, as when glacial acetic acid is to be formed from chromic acetate penta- or hexahydrate, nickelous acetate tetrahydrate or cobaltous acetate tetrahydrate. Thus the water may be removed as an azeotropic mixture, for instance with benzene vapour; the azeotroping substance may of course be present during the actual decomposition and/or may be added to the vapours after the decomposition and before condensation. Such azeotropic removal may be effected in any convenient way; for instance the vapours containing the azeotroping substances may be cooled to temperatures at which the acetic or other aliphatic acid is condensed, while the azeotropic aqueous mixture remains in the vapour phase. The condensation of the acid may conveniently be effected in columns, preferably provided with dephlegmators, up which the aqueous reaction vapours, together with any other inert or azeotroping vapours present during the decomposition, may be caused to rise, and into which an azeotroping substance is introduced in liquid and/or vapour form. Thus for example an azeotroping liquid may be caused to trickle down the tower in counter-current to a mixture of the vapours of the acid, water and the azeotroping substance.

If desired, of course, the concentrated acid may be obtained from the salts by the action of sulphuric acid, phosphoric acid or the like, but it is preferred to obtain the acid by thermal decomposition as described above.

The residue remaining after the decomposition may with advantage be employed again for the treatment of further quantities of dilute acid; preferably such residues are first subjected to oxidation to ensure that all the metal is present in the combined state. However, as explained above, the free metals may be employed if desired.

When acetic acid is to be concentrated by means of cupric acetate, it is advisable to work throughout in the presence of free acetic acid. Thus the neutralization of the acid is preferably incomplete, and any concentration of the solution before crystallizing out or otherwise separating the salt from the mother liquor should be carried out in the presence of free acetic acid. Moreover, if the salt is heated to drive off some or all of its water of crystallization, acetic acid should still be present. By means of these precautions the formation of substantial quantities of basic acetate may be avoided. When the other suitable heavy metals are employed, neutralization may, in general, safely be carried to completion, although it may, of course, be partial if desired.

The invention is particularly concerned with the concentration of dilute acetic acid such as is recovered from the acetylation of cellulose, and of other moderately dilute acetic acids, of concentration between 10 and 40%. It is however not confined to the treatment of such acids, but may be employed for the concentration of still more dilute acids, or of more concentrated acids. Moreover, the invention is not restricted to the production of "glacial" or substantially 100% acids, but may also be employed in the production of less concentrated acids, or of mixtures of anhydrides and acids, or even of anhydrides alone. For treating acids of initial concentration below about 10% it may be advisable to employ a metal other than copper, as at such dilutions there may be formed a certain amount of basic copper acetate.

The invention may of course be applied to the concentration of acids other than acetic acid, such as propionic acid.

The process of the invention, besides providing a convenient and efficient method of concentrating aliphatic acids to any desired degree, offers in the case of impure aqueous acids a valuable means of purification, since many of the impurities which are present in the acids are incapable of reacting with the heavy metal or compound thereof employed, and are readily separated from the aliphatic acid salts.

The following example illustrates the invention but is not to be regarded as in any way limiting it.

Example 200 gallons of 20% acetic acid recovered from a cellulose acetylation is heated to 90° C. and 200 lbs. of cupric oxide gradually added. The acid solution of cupric acetate so obtained is cooled, whereupon a product consisting mainly of cupric acetate pentahydrate is obtained; this is heated in a current of air first to 75° C. in order to drive off 4 molecules of water of crystallization, and then to 300° C. and the acetic acid thus obtained is recovered by condensation.

What I claim and desire to secure by Letters Patent is:—

1. Process for the concentration of aqueous solutions of aliphatic acids, which comprises treating the solutions with a substance, selected from the group consisting of metals from whose salts with the aliphatic acids aliphatic acids may be recovered by thermal decomposition of the salts, and oxides, hydroxides and carbonates of such metals, to form the normal salt of the metal with the acid, separating from the mother liquor the salt so formed and subsequently subjecting the salt to thermal decomposition, the formation of substantial quantities of basic salt being avoided throughout the process.

2. Process for the concentration of aqueous solutions of acetic acid, which comprises treating the solutions with a substance, selected from the group consisting of metals from whose acetates acetic acid may be recovered by thermal decomposition, and oxides, hydroxides and carbonates of such metals, to form the normal salt of the metal with the acid, separating from the mother liquor the acetate so formed and subsequently subjecting the acetate to thermal decomposition, the formation of substantial quantities of basic salt being avoided throughout the process.

3. Process for the concentration of aqueous solutions of acetic acid obtained from the acetylation of cellulose, which comprises treating the solutions with a substance, selected from the group consisting of metals from whose acetates acetic acid may be recovered by thermal decomposition and oxides, hydroxides and carbonates of such metals, to form the normal salt of the metal with the acid, separating from the mother liquor the acetate so formed and subsequently subjecting the acetate to thermal decomposition, the formation of substantial quantities of basic salt being avoided throughout the process.

4. Process for the concentration of aqueous solutions of acetic acid, which comprises treating the solutions with a substance, selected from the group consisting of metals from whose acetates acetic acid may be recovered by thermal decomposition, and oxides, hydroxides and carbonates of such metals, to form the normal salt of the metal with the acid, separating from the mother liquor the acetate so formed and subsequently subjecting the acetate to thermal decomposition at a temperature between 200° and 450° C., the formation of substantial quantities of basic salt being avoided throughout the process.

5. Process for the concentration of aqueous solutions of acetic acid, which comprises treating the solutions with a substance, selected from the group consisting of metals from whose acetates acetic acid may be recovered by thermal decomposition, and oxides, hydroxides and carbonates of such metals, to form the normal salt of the metal with the acid, separating from the mother liquor the acetate so formed and subsequently subjecting the acetate to thermal decomposition in a current of an indifferent gas, the formation of substantial quantities of basic salt being avoided throughout the process.

6. Process for the concentration of aqueous solutions of acetic acid, which comprises treating the solutions with a substance, selected from the group consisting of metals from whose acetates acetic acid may be recovered by thermal decomposition and oxides, hydroxides and carbonates of such metals, to form the normal salt of the metal with the acid, separating from the mother liquor the acetate so formed and subsequently subjecting the acetate to thermal decomposition, the formation of substantial quantities of basic salt being avoided throughout the process, and separating water contained in the vapors so obtained from the acid.

7. Process for the concentration of aqueous solutions of acetic acid, which comprises treating the solutions with a substance, selected from the group consisting of metals from whose acetates acetic acid may be recovered by thermal decomposition and oxides, hydroxides and carbonates of such metals, to form the normal salt of the metal with the acid, separating from the mother liquor the acetate so formed and subsequently subjecting the acetate to thermal decomposition, the formation of substantial quantities of basic salt being avoided throughout the process, and separating the water contained in the vapors, from the acid, by means of a substance forming an azeotropic mixture with water.

8. Process for the concentration of aqueous solutions of acetic acid, which comprises treating the solutions with a substance selected from the group consisting of copper, copper oxide, copper hydroxide and copper carbonate in amount such that the solution remains acid, separating the copper acetate so formed and subsequently subjecting it to thermal decomposition, the whole process being carried out in the presence of free acetic acid.

HENRY DREYFUS.